(12) United States Patent
Tanner et al.

(10) Patent No.: US 9,529,101 B2
(45) Date of Patent: Dec. 27, 2016

(54) RADIATION DETECTION

(75) Inventors: Rick Tanner, Didcot (GB); Jonathan Eakins, Didcot (GB)

(73) Assignee: The Secretary of State for Health, London (GB)

( * ) Notice: Subject to any disclaimer, the term of this patent is extended or adjusted under 35 U.S.C. 154(b) by 854 days.

(21) Appl. No.: 12/742,875

(22) PCT Filed: Nov. 14, 2008

(86) PCT No.: PCT/EP2008/065612
§ 371 (c)(1),
(2), (4) Date: Aug. 20, 2010

(87) PCT Pub. No.: WO2009/063078
PCT Pub. Date: May 22, 2009

(65) Prior Publication Data
US 2010/0301222 A1 Dec. 2, 2010

(30) Foreign Application Priority Data
Nov. 15, 2007 (GB) .................................. 0722430.6

(51) Int. Cl.
*G01T 3/08* (2006.01)
*G01T 3/00* (2006.01)

(52) U.S. Cl.
CPC ......................................... *G01T 3/00* (2013.01)

(58) Field of Classification Search
USPC ................................................ 250/370.05, 391
See application file for complete search history.

(56) References Cited

U.S. PATENT DOCUMENTS

| 3,792,280 | A | * | 2/1974 | Piltingsrud | ............... G01T 3/00 250/390.03 |
| 5,278,417 | A | | 1/1994 | Sun | |
| 5,578,830 | A | * | 11/1996 | Olsher et al. | ............ 250/390.03 |
| 6,930,311 | B1 | * | 8/2005 | Riel | ......................... 250/390.01 |
| 7,655,921 | B2 | | 2/2010 | Fehrenbacher | |

FOREIGN PATENT DOCUMENTS

| GB | 2 375 221 A | 11/2002 |
| JP | 61028885 A | 2/1986 |
| JP | 2002-311147 | 10/2002 |

(Continued)

OTHER PUBLICATIONS

Notification of Reasons for Refusal mailed Sep. 13, 2012, issued in corresponding Japanese Patent Application No. 2010-533605, filed Jul. 20, 2007, 6 pages.

(Continued)

*Primary Examiner* — Rafferty Kelly
(74) *Attorney, Agent, or Firm* — Christensen O'Connor Johnson Kindness PLLC

(57) ABSTRACT

An instrument for detecting radiation is provided, which comprises an inner core housing a neutron detector, and an outer core comprising a neutron-moderating material, the instrument further including at least one elongate thermal neutron guide located within the outer core and having an inner end that terminates proximal to the neutron detector. In use, the elongate thermal neutron guide channels thermal neutrons towards the neutron detector. Also provided is a method for using said instrument.

31 Claims, 18 Drawing Sheets

(56) References Cited

FOREIGN PATENT DOCUMENTS

| JP | 2002-341046 A | 11/2002 |
|---|---|---|
| JP | 2007-533984 A | 11/2007 |
| WO | 98/25160 A1 | 6/1998 |

OTHER PUBLICATIONS

International Search Report dated Jun. 2, 2009, issued in corresponding International Application No. PCT/EP2008/065612, filed Nov. 14, 2008, 9 pages.
Patent Examination Report No. 1 received Mar. 12, 2013, issued in corresponding Australian Patent Application No. 2008322866, filed Nov. 14, 2008, 3 pages.
Japanese Office Action mailed Apr. 2, 2013, issued in corresponding Japanese Application No. 2010-533605, 4 pages.
Australian Patent Examination Report No. 2, mailed Nov. 11, 2013, issued in corresponding Australian Patent Application No. 2008322866, filed May 22, 2009, 3 pages.
Canadian Examiner's Report, mailed Jul. 23, 2015, issued in corresponding International Application No. PCT/EP2008/065612, filed Nov. 14, 2008, 4 pages.
Japanese Office Action, mailed Feb. 5, 2015, issued in corresponding Japanese Application No. 2014-055850, filed Mar. 19, 2014, 20 pages.
European Office Action dated Feb. 26, 2015, issued in corresponding European Application No. 08 850 441.0, filed Nov. 14, 2008, 4 pages.
Decision of Refusal, mailed Nov. 9, 2015, issued in corresponding Japanese Patent Application No. 2014-055850, filed Mar. 27, 2014, 10 pages.

* cited by examiner

RADIATION DETECTION

This invention concerns instruments and methods for measuring neutron radiation, in particular for measuring dose equivalent rates from neutrons.

Accurate measurement of neutron dose rates is important in ensuring that environments intended for operations involving personnel access are accurately surveyed and/or that personnel operating in environments where significant radiation exists receive a dose suitably below the limit permitted. It is also important in ensuring that the dose rates in public access areas are below the permitted limits.

In most cases the field consists of neutrons with a range of energies. The spread of this distribution and the proportions of the dose in each part are significant because of the differing level of biological hazard they present. Thus, there is a need in the art for a device that can accurately detect neutrons with low (<0.4 eV), intermediate (0.4 eV to 10 eV) and high (10 keV to 20 MeV) energies.

Prior art instruments are limited in terms of the range of neutron energies they can monitor accurately—particular problems occur at the high energy range as such particles can have a high probability of passing straight through the device without being detected. This problem is illustrated by the devices described in U.S. Pat. No. 4,588,898. In more detail, whilst the use of polyethylene helps to moderate fast and intermediate energy neutrons, the volume of polyethylene necessary to moderate high energy neutrons efficiently is prohibitive in terms of weight and size. Conversely, the use of excessive polyethylene prevents efficient detection of thermal (i.e. low energy) neutrons. Such devices, therefore, detect neutrons in parts of the energy range with low efficiency.

One means for addressing the above-mentioned problem is to employ a device that detects neutrons over a limited energy range, and then to apply a mathematical "weighting formula" to the results to obtain a "total dose equivalent".

Such mathematical weighting is, however, fraught with inaccuracies, as it avoids direct measurement of neutrons across a wide range of energy levels.

A second problem associated with prior art instruments is that the sensitivity may vary significantly according to the energy range of interest. Thus, if the device in question is calibrated using high energy neutrons, the reading in the presence of lower energy neutrons can be erroneous. Likewise, if it were possible to perform calibration using a low energy source, readings for higher energy neutrons would be incorrect. Whilst the use of supplemental spectroscopic measurements can be employed to establish the energy distribution of the neutrons detected and so apply a correction factor, this is time consuming, expensive and impractical. It also relies on the fields in which the instrument is used not varying from location to location, or within a location.

The above-mentioned inaccuracies have been tolerated in the past—it was thought the worst deviations occurred in parts of the neutron energy range that were not of great importance or where little dose equivalent was received. More recently, however, it has been realised that the relative risk factor for neutrons is greater than previously accepted (the maximum quality factor for neutrons was increased from 20 to 30 relative to that for photons). As a result, increased sensitivity with less deviation throughout a wide energy range is required.

As a further complication, the definitions used in radiation protection are periodically updated. When this causes changes to the quality factor or radiation weighting factor for neutrons, the relative importance of different parts of neutron energy range changes. The nature of many prior art instruments means that such changes would require wide-scale reconfiguration of the device, even necessitating hardware replacement, or else acceptance of large deviations. A more versatile instrument is thus required.

EP943106 describes a neutron-detecting device that demonstrates some improvements over earlier detection devices. In more detail, the described device is based on a central, $^3$He core detector, which operates in combination with six photodiodes located at a shallow depth below the surface of a moderating polyethylene sphere as neutron detectors. The central detector is located within a polyethylene shell, which is encased by a boron-loaded rubber shell (Flex/Boron). Outside the boron-loaded rubber is a further polyethylene shell. In use, the outer polyethylene shell moderates fast neutrons, the boron-loaded layer attenuates low-energy neutrons incident on the instrument, and the inner polyethylene shell moderates further the neutrons that penetrate the boron-loaded layer. The EP9431060 device makes it possible to constrain the H'*(10) response to within a factor of 2 of a presumed calibration, which represents an improvement over pre-existing neutron area survey instruments (Bartlett et al, 1997).

Whilst the EP943106 device offers some advantages in terms of energy dependence of response, it is expensive to construct compared with prior designs because of the requirement for seven detectors. In addition, the requirement for both high and low voltage power supplies complicates the instrument further and hence adds to the price. A further problem associated with the EP943106 device is that it is relatively heavy—this is a particular problem in the context of hand-held devices, the use of which requires an operator to hold the device at arms-length to avoid interactions caused by the operator's body.

Thus, there is a need for a more practical neutron survey instrument that addresses one or more of the above problems.

The present invention solves one or more of the above problems.

According to a first aspect of the present invention, there is provided an instrument for detecting radiation, wherein the instrument comprises: i) an inner core comprising a neutron detector; ii) an outer core comprising a neutron-moderating material, said outer core having an external surface; and iii) at least one elongate thermal neutron guide located in the outer core, said elongate guide having an inner end and an outer end, wherein:
(a) the thermal neutron guide extends in a direction from the external surface of the outer core to the neutron detector and, in use, channels thermal neutrons towards the neutron detector, and
(b) the inner end of the thermal neutron guide is proximal to the neutron detector.

In one embodiment, the instrument, more specifically the inner core neutron detector, is sensitive primarily to thermal (low energy) neutrons and obviates the need for multiple detectors. In the context of the present invention, low energy (ie. thermal) neutrons means those with an energy of less than 0.4 eV. Said thermal neutrons preferably have a mean energy (at room temperature) of less than 100 meV, or less than 50 meV, or less than 30 meV, for example in the region of 25.3 meV.

In use, the instrument reduces overestimates of intermediate energy neutrons (0.4 eV to 100 keV), which are characteristic of other single detector survey instruments.

During operation, the instrument is preferably held away from the operator at arms' length. To facilitate this, the instrument has a maximum weight that is less than 10 kg, for example less than 8 kg, or less than 6 kg.

In one embodiment, the neutron-moderating material is a solid material that comprises one or more hydrogen-containing material, such as one or more plastic material, e.g. polyethylene or another hydrogen-containing or hydrocarbon polymer. The use of a material with an average density of between 0.6 and 1.5 $g/cm^3$ is preferred, more preferably between 0.7 and 1.2 $g/cm^3$, even more preferably between 0.8 and 1.15 $g/cm^3$, and most preferably between 0.90 and 1.00 $g/cm^3$.

The neutron-moderating material may comprise one or more different materials. In one embodiment, one or more of said different materials may be arranged in corresponding layer(s), preferably a discrete layer(s) around the inner core. In another embodiment, two or more of said different materials may form composites, mixtures and/or amalgams, which may be arranged as one or more layer(s), preferably a discrete layer(s) around the inner core. The one or more different materials preferably have a high thermal neutron capture cross-section. In one embodiment, each layer has a thickness in a direction from the inner core to the external surface of the outer core. By way of example, the direction is the direction that provides the shortest distance from the inner core to the external surface of the outer core. In this regard, in an embodiment where the outer core is substantially a spherical shape, the direction would be a substantially radial direction.

The outer core may contain a neutron-attenuating material, such as boron or a boron-containing material, cadmium or a cadmium-containing material, lithium or a lithium-containing material, or composites, mixtures and/or amalgams thereof. Where the neutron-attenuating material comprises boron or boron-containing material, the boron may be natural or enriched in a boron isotope such as boron-10. If the material comprise lithium or a lithium-containing material, the lithium may be either natural or enriched in a lithium isotope such as lithium-6. The neutron-attenuating material may be provided in powder form, as a metal layer(s), or in a matrix such as a plastic matrix. In one embodiment, the neutron-attenuating material forms one or more layers (preferably a discrete layer(s)) within the outer core. In one embodiment, the neutron-attenuating material may form a layer that defines an inner surface of the outer core. Alternatively, the neutron-attenuating material may be sandwiched between neutron-moderating material(s) located within the outer core—the sandwiching neutron-moderating material(s) may be present as layers.

Preferably the outer core substantially surrounds the inner core. The outer core may contact the inner core.

The outer core may be provided with a carrying handle and/or an externally mounted electronic processing means. It may also have protruding feet. The processing means may alternatively be positioned away from the device. In use, the processing means is in communication with the device. Suitable processing means includes one or more of hard wiring, optical, radio or other means.

The inner core may comprise or consist of one or more neutron detectors. The detector(s) may be selected from one or more of the $^3$He type; the $BF_3$ type; and a $^6$Li and $^7$Li converter pair, scintillators and photo multiplier tubes, or a material from which delayed beta decays can be detected, e.g. silver. Preferably, the instrument comprises or consists of a single neutron-sensitive detector.

In one embodiment, the inner core is spherical. Preferably the outer core is shaped or dimensioned to provide a substantially even thickness of material around the inner core. The outer core may be spherical. Alternatively, the outer core may be cylindrical with hemispherical ends, in which case the inner core preferably has a corresponding, though smaller shape.

The device may comprise one or more thermal neutron guide(s). Preferably the device comprises at least 2 or 4, or at least 6 or 8, or at least 10 or 12 thermal neutron guides. In one embodiment, the device comprises 14 thermal neutron guides.

Preferably, the thermal neutron guide(s) are arranged symmetrically around the inner core. In one embodiment, the guide(s) extend in a generally radial direction from the inner core or detector to the external surface of the outer core.

The thermal neutron guide(s) may extend all the way from the external surface of the outer core to the inner core/detector. Alternatively, the thermal neutron guide(s) may terminate short of the inner core and/or short of the external surface of the outer core. In a preferred embodiment, the thermal neutron guide(s) contact with the inner core, preferably with the central detector.

In one embodiment, the thermal neutron guide(s) are structurally distinct from (and preferably free from) neutron-moderating and/or neutron-attenuating material.

In one embodiment, the thermal neutron guide(s) extend in a direction away from the external surface of the outer core to the inner core/detector. Preferably, the thermal neutron guide(s) provide a single line-of-sight for channelling thermal neutrons from outside of the device to the inner core. In one embodiment, the guide(s) are elongate and straight. It is preferred that the thermal neutron guide(s) extend in a direction that provides the shortest distance from the inner core to the external surface of the outer core. By way of example, in an embodiment where the outer core is substantially a spherical shape, the direction would be a substantially radial direction.

The thermal neutron guide(s) may comprise or consist of a solid material, preferably a metal such as aluminium or lead, most preferably aluminium.

Alternatively, the thermal neutron guide(s) may comprise or consist of a fluid material, preferably air. In this embodiment, the guide(s) are preferably provided by bore holes in the neutron-moderating and/or neutron-attenuating material. Alternatively, the thermal neutron guide(s) may comprise of a vacuum or a partial vacuum.

The cross-sectional area of the thermal neutron guide(s) may be substantially constant along their whole length. Alternatively, the cross-sectional area of the thermal neutron guide(s) may vary along their length. In one embodiment, the cross-sectional area increases in the direction away from the inner core towards the external surface of the outer core. In a preferred embodiment, the cross-sectional area of a portion of the guide(s) located towards the external surface of the outer core may be greater than the cross-section of a portion of the guide(s) located towards the inner core.

In one embodiment, the thermal neutron guide(s) extends in a direction towards the inner core such that the inner end of the guide(s) is in close proximity to the detector. By way of example, the inner end of the guide(s) may terminate at a position such that the distance between the guide end and the inner detector is less than 20 mm, less than 15 mm, less than 10 mm, less than 8 mm, or less than 5 mm. Alternatively, the guide(s) may extend all of the way to the detector (ie. abut with the detector) at the heart of the instrument. In this regard, if there is a significant amount of moderating material between the inner end of the guide and the detector, then the response of the instrument will be adversely affected: the guide will not be able to effectively raise a response to thermal neutrons. This problem is observed with several prior art devices, such as the detector described in DE19627264C1, and is addressed and solved by the present invention.

The elongate thermal neutron guide(s) may terminate (at or near the external surface of the outer core) in a flat or substantially flat outer end. Alternatively, the outer end may terminate in a concave axial cross-section shape, such as an inverted point, an inverted dome, a semi-circle, a "V"-shape or a "U"-shape (as shown, for example, in some of the accompanying Figures). Thus, the outer end of a guide may be shaped to modify the direction dependence of response for low energy neutrons. For example, with a flat guide end (or with a guide end that is flush with the outer surface of the instrument), the instrument typically responds preferentially to neutrons that are incident plane parallel along the axis of a particular guide. Alternatively, provision of a concave outer guide end modifies the direction dependence of response of the instrument, which is preferred. By way of example, the concave end of a guide may provide an average concave radius of approximately or up to 20 mm, 15 mm or 10 mm. A concave guide feature is more than just a simple neutron channel, since it is so designed to avoid the instrument from over-responding to neutrons incident from specific directions. By way of example, an instrument may comprise 2, 4, 6 or 8 such concave guides. The geographic arrangement/positioning of concave guides versus non-concave guides (e.g. conventional guides) in an instrument may be random. Alternatively, concave guides may be arranged into 'pairs', such that the two members of each pair are located on substantially opposite sides of the detector (e.g. the respective concave guide ends of a pair may be diametrically opposed). In one embodiment, all of the instrument guide(s) are concave guide(s).

The guide(s) may include a protective end to prevent debris from entering the device from the external surroundings. The protective end may be in the form of a plug. By way of example, a plug may be formed from the same material as the moderator material or from a material chosen to help thermal neutrons enter the thermal neutron guide(s), e.g. a metal. In one embodiment, the protective end material per se does not substantially moderate or attenuate neutrons, especially low energy neutrons. Alternatively, the protective end may be a continuation of a component of the outer core material.

In one embodiment the instrument is capable of efficiently detecting neutrons in the energy range of 0.1 meV to 20 MeV (or higher), or in the energy range of 0.5 meV to 15 MeV, or in the energy range of 1 meV to 10 MeV, In a preferred embodiment, the instrument can detect neutrons in a substantially non-directionally sensitive manner. In one embodiment, where the electronics of the device are detached, the response does not vary for any angle of incidence. In another embodiment, where the electronics are attached to the moderator, the response does not vary appreciably for any angle of incidence in the plane perpendicular to the axis through the electronics and moderator. In that embodiment, the response does not vary appreciably for an angle in a ±150° arc from the axis through the electronics and moderators, where 0° is defined as incidence from opposite the electronics.

According to a second aspect of the invention, there is provided a method of detecting radiation using an instrument according to the first aspect of the invention, wherein said method comprises contacting the instrument with neutrons, generating one or more signals following contact between the neutrons and neutron detector, and detecting said one or more signals.

According to a further aspect of the invention, there is provided a method for enhancing the detection of thermal neutrons incident on an instrument comprising a neutron detector, said method comprising the preferential channelling of thermal neutrons along at least one elongate thermal neutron guide having an inner end that terminates proximal to the detector, followed by detection thereof by the neutron detector.

A further aspect of the invention provides use of an elongate thermal neutron guide(s) in an instrument for detecting thermal neutrons, wherein the guide(s) terminate at a position proximal to the detector, and wherein, in use, the thermal neutron guide(s) channel thermal neutrons towards a neutron detector. The thermal neutron guide is a feature located in the moderator/absorber designed to:

- effectively channel neutrons to the centre of the device
- modify the efficiency of the channelling according to the direction and energy of the neutron
- ensure passage through the absorbing layer and all the way to the central detector The guide may have variable cross-sectional area to ensure that the instrument does not preferentially detect neutrons within a particular energy range.

Various embodiments of the invention will now be described with reference to the drawings in which:

FIG. 1 shows a cross-sectional representation of one embodiment of the instrument of the present invention. The thermal neutron guide(s) are shown extending from the inner core (detector) to the external surface of the outer core. The outer core comprises a neutron-attenuating layer sandwiched between neutron-moderating layers.

Figure 9:
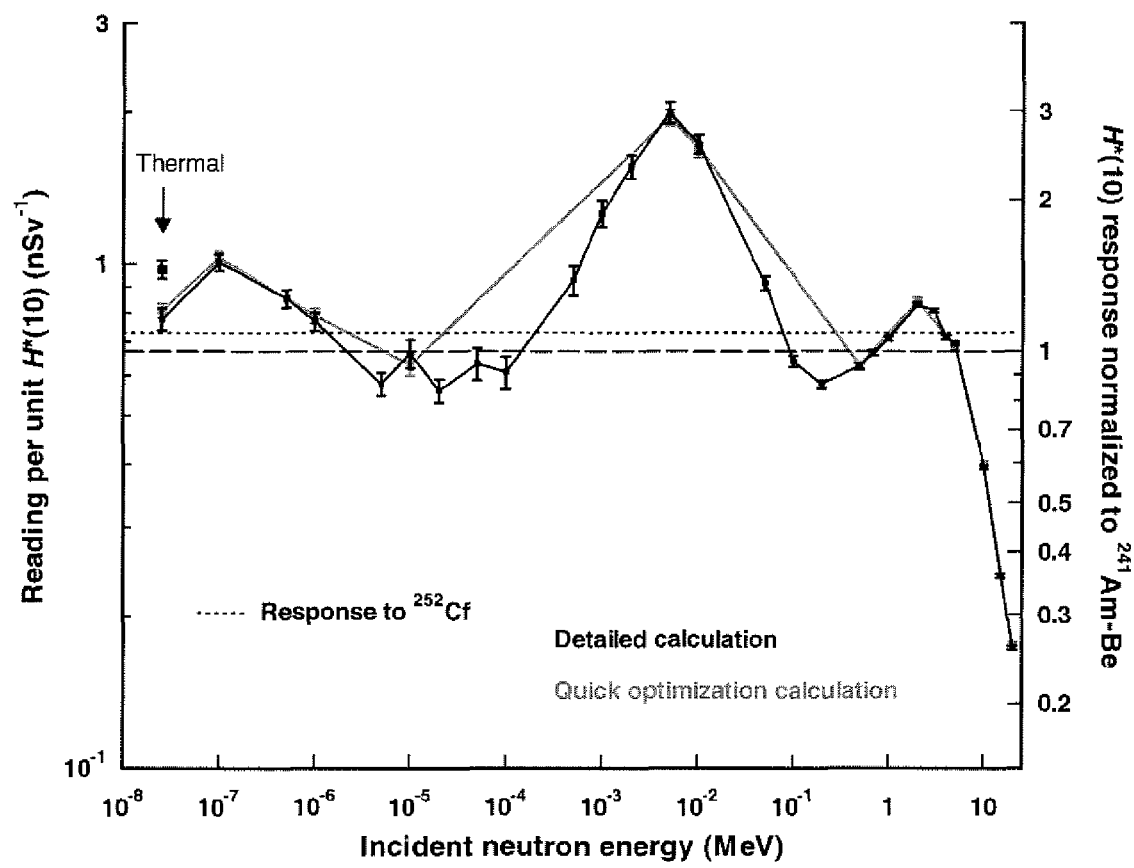

FIG. 9 shows the H*(10) response of the exemplified design showing data from the optimization calculations and for more energies. Three energy distributions have also been used: thermal, $^{252}$Cf and $^{241}$Am—Be. These are not plotted as part of the curve.

Figure 10:
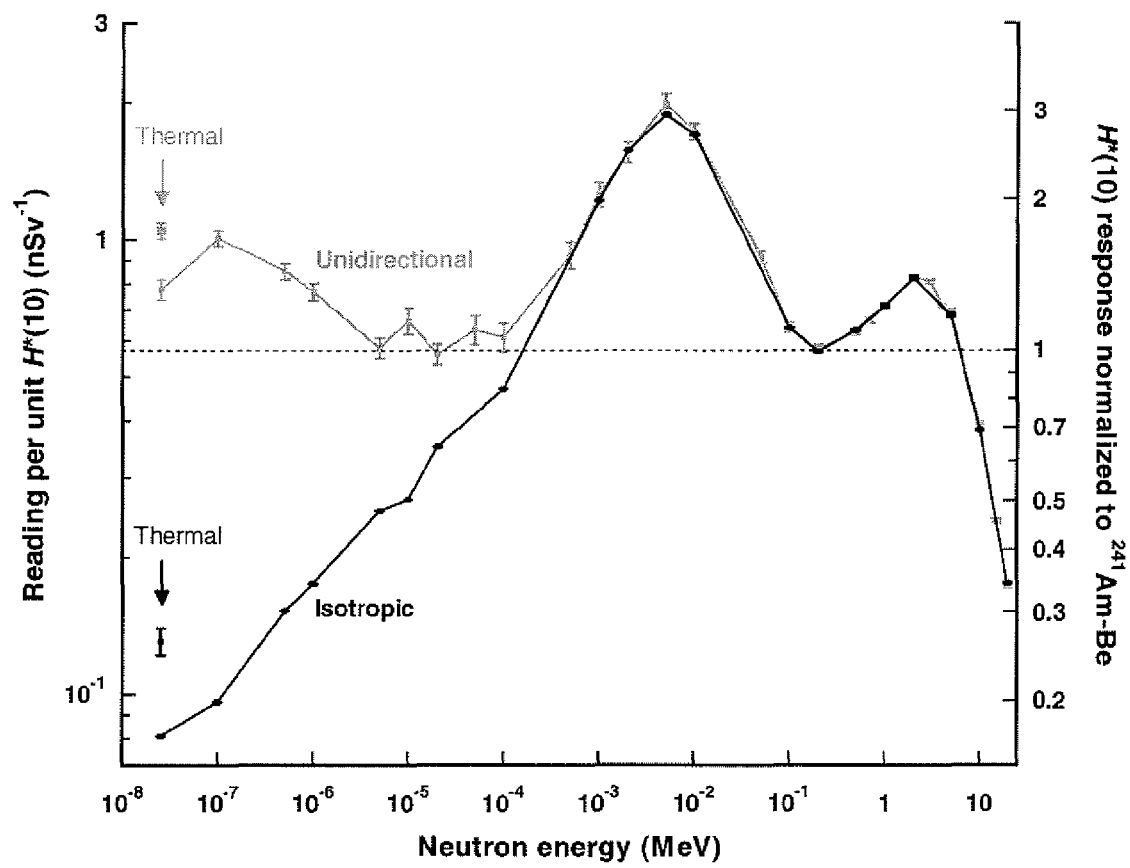

FIG. 10 shows the H*(10) response to unidirectional and isotropic sources. The unidirectional source is directed along the axis of two of the guide(s). These data are for neutron guides with flat outer ends.

Figure 11:
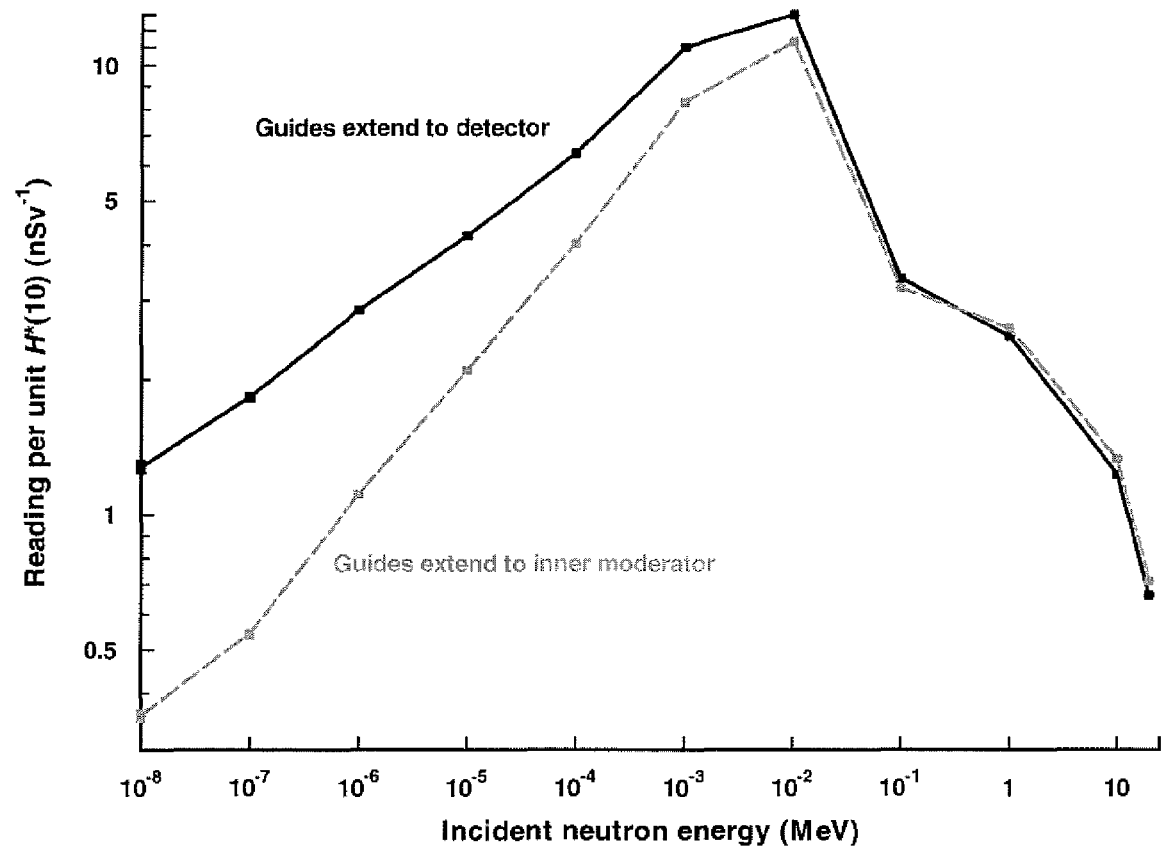

FIG. 11 shows the H*(10) response of a device with neutron guides that penetrate the neutron absorbing layer, but which do not carry on further to reach the detector. The H*(10) response of a device which has guides that channel neutrons all the way to the central detector is also depicted for contrast. The bores which do not extend all of the way to the central detector are seen to fail to guide thermal and low energy neutrons effectively for detection.

Figure 12:
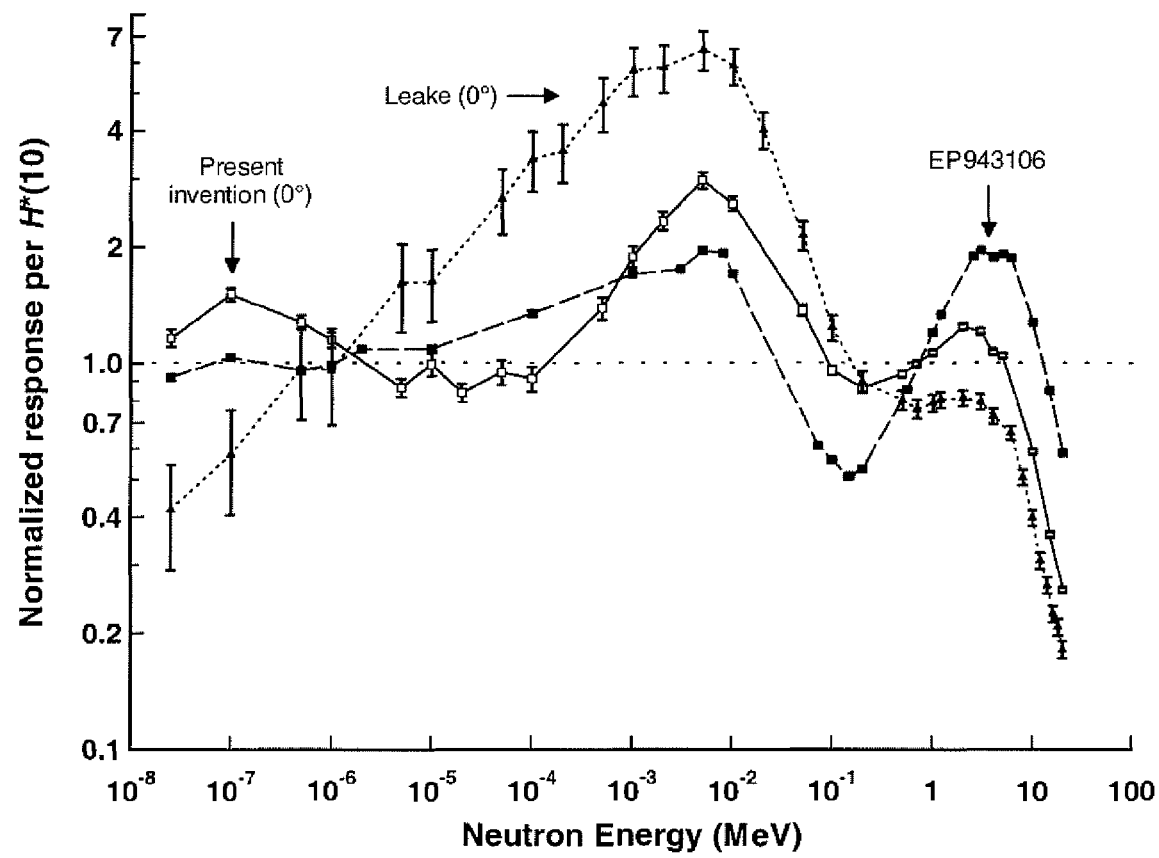

FIG. 12 shows the ambient dose equivalent response characteristics of a device according to the present invention, compared with those for the Leake and EP943106 devices.

Figure 13:
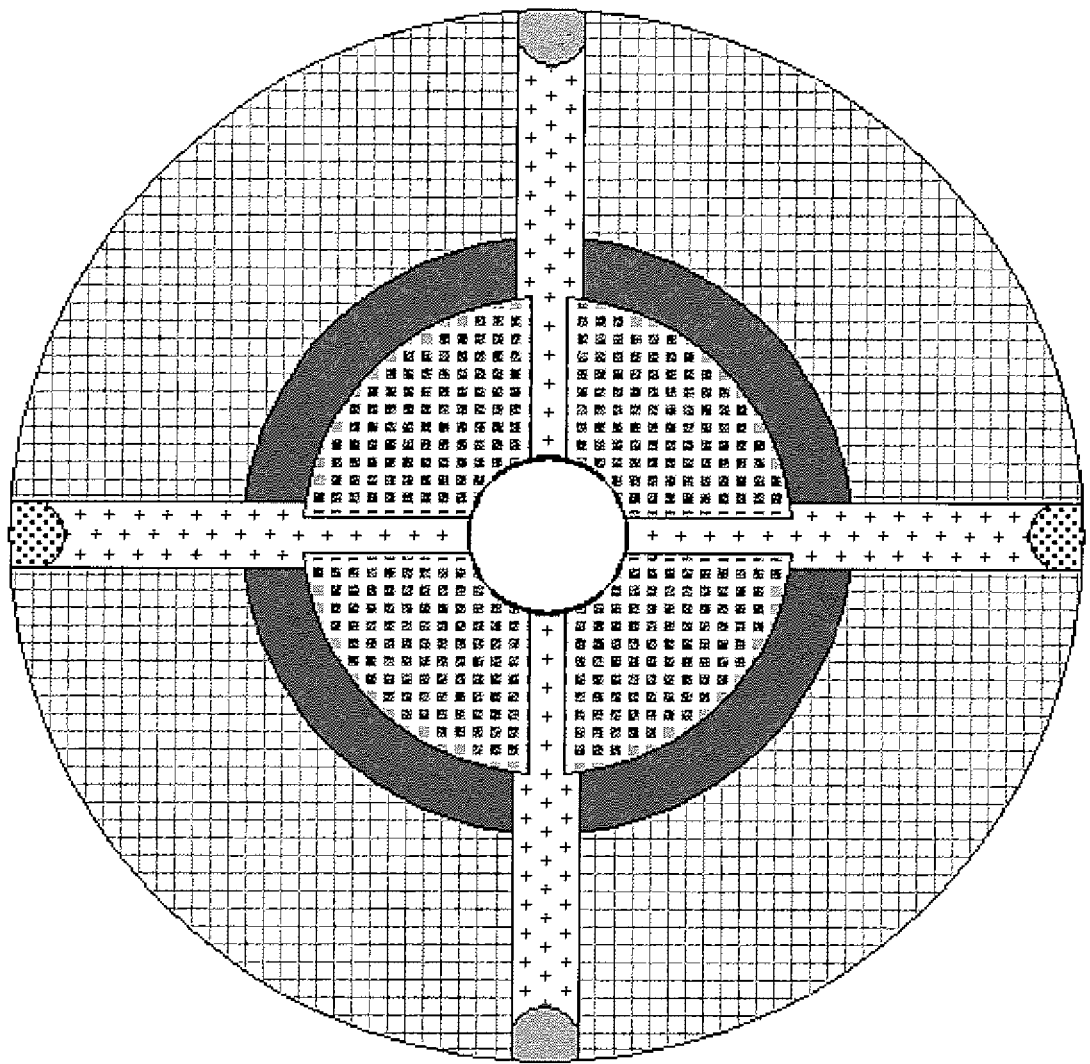

FIG. 13 shows a device with hemispherical inserts into the end of each guide which are intended to modify the directional dependence of response at low energies. The plugs at the end of the guide may be made from the same material as the outer moderator or from a material chosen to ease construction or modify the response characteristics.

Figure 14:
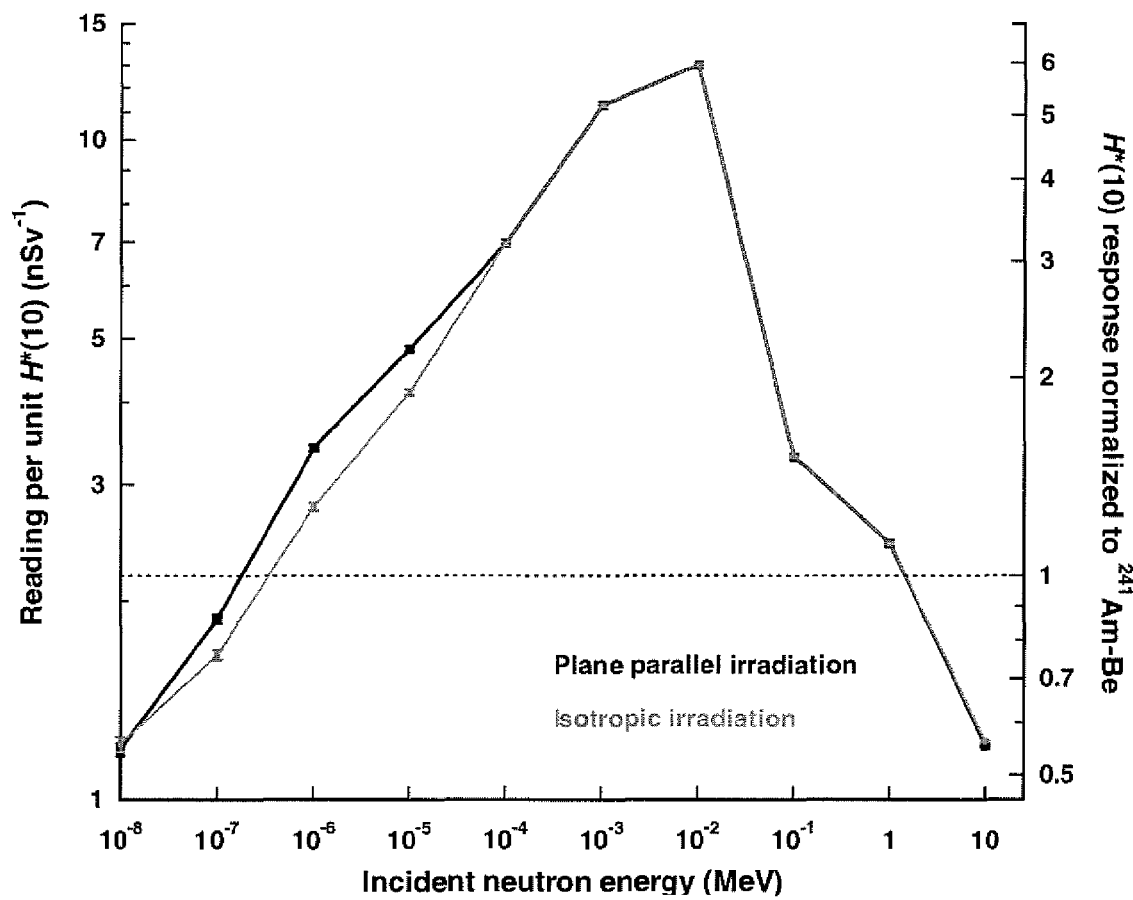

FIG. 14 shows the ambient dose equivalent response characteristics of a device that has 7 mm radius hemispherical inserts into the end of the guide. The device has been modelled for plane parallel and isotropic neutron fields. The results should be contrasted with those presented as FIG. 10.

Figure 15:
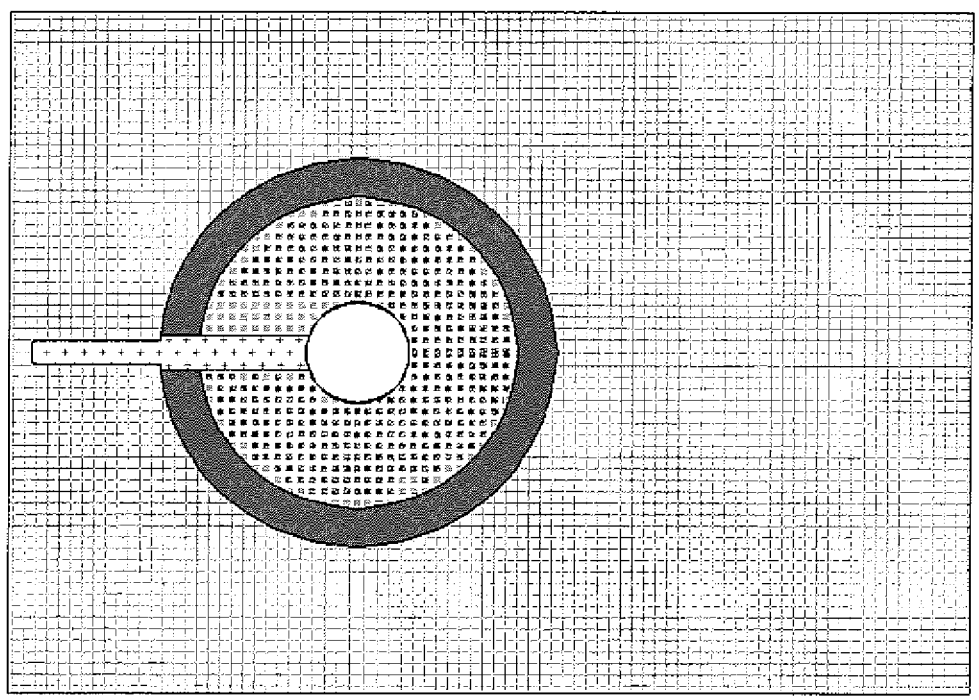

FIG. 15 shows a cylindrical device with a single neutron guide.

Figure 16:
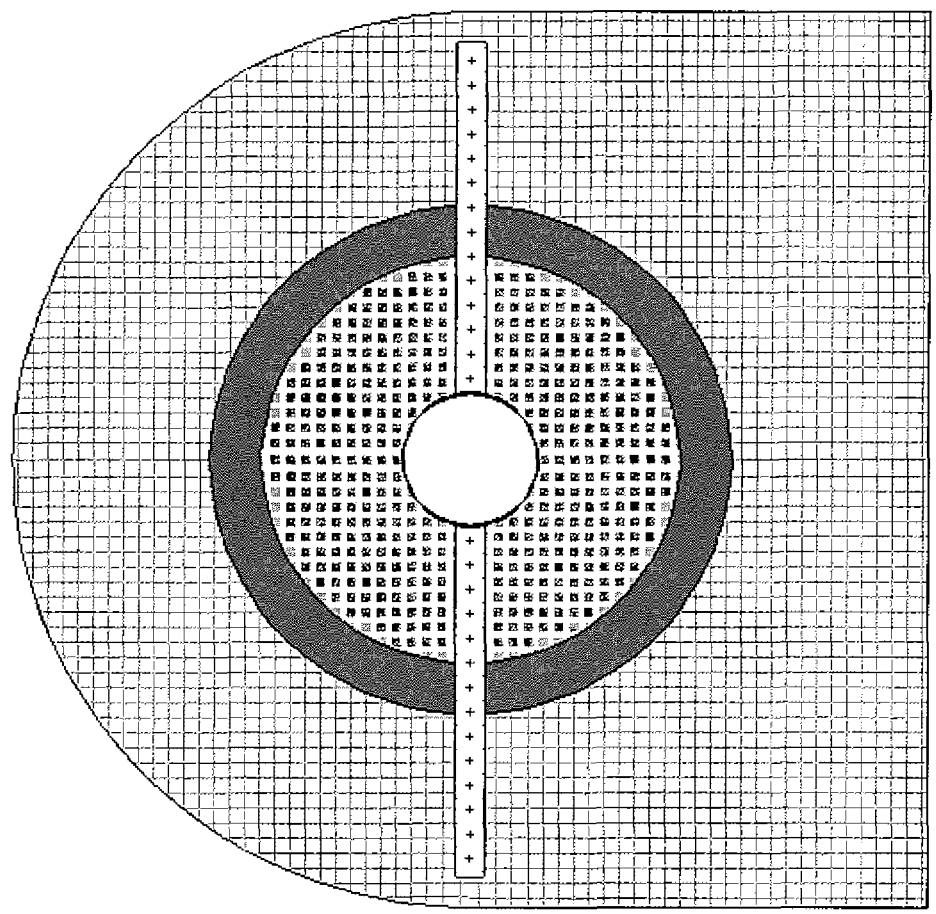

FIG. 16 shows a "bullet-shaped" device with two neutron guides in a cut through the middle of the device. Additional guides project out of and into the page, making a total of four guides.

Figure 17:
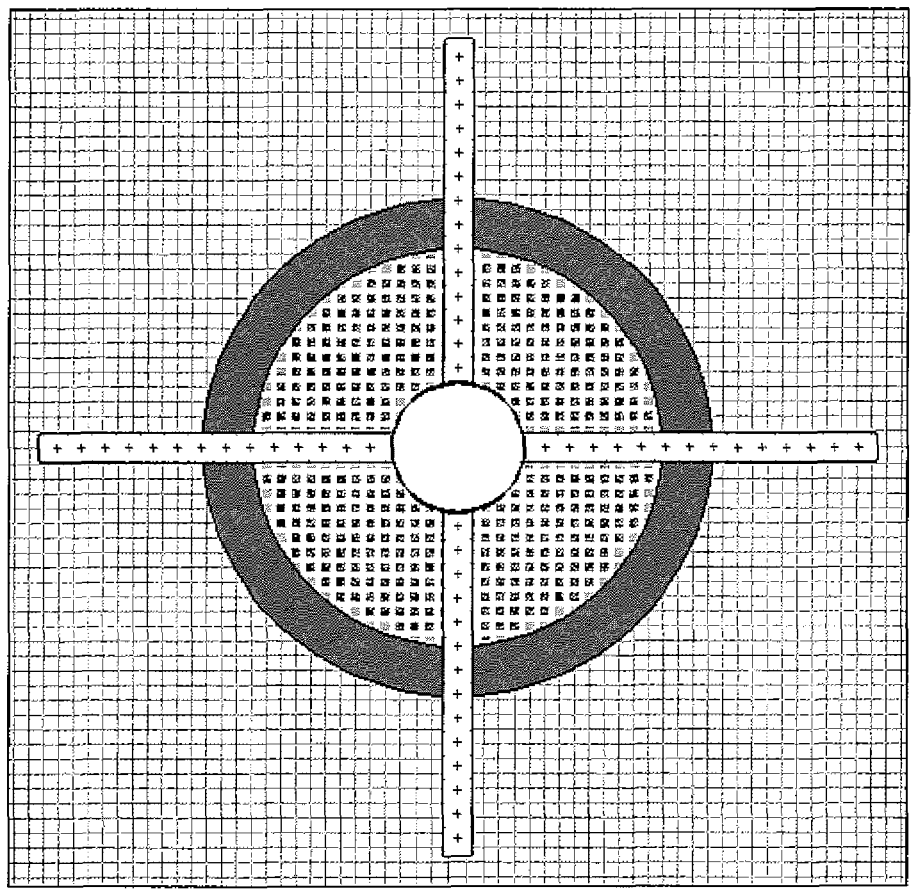
Figure 18:
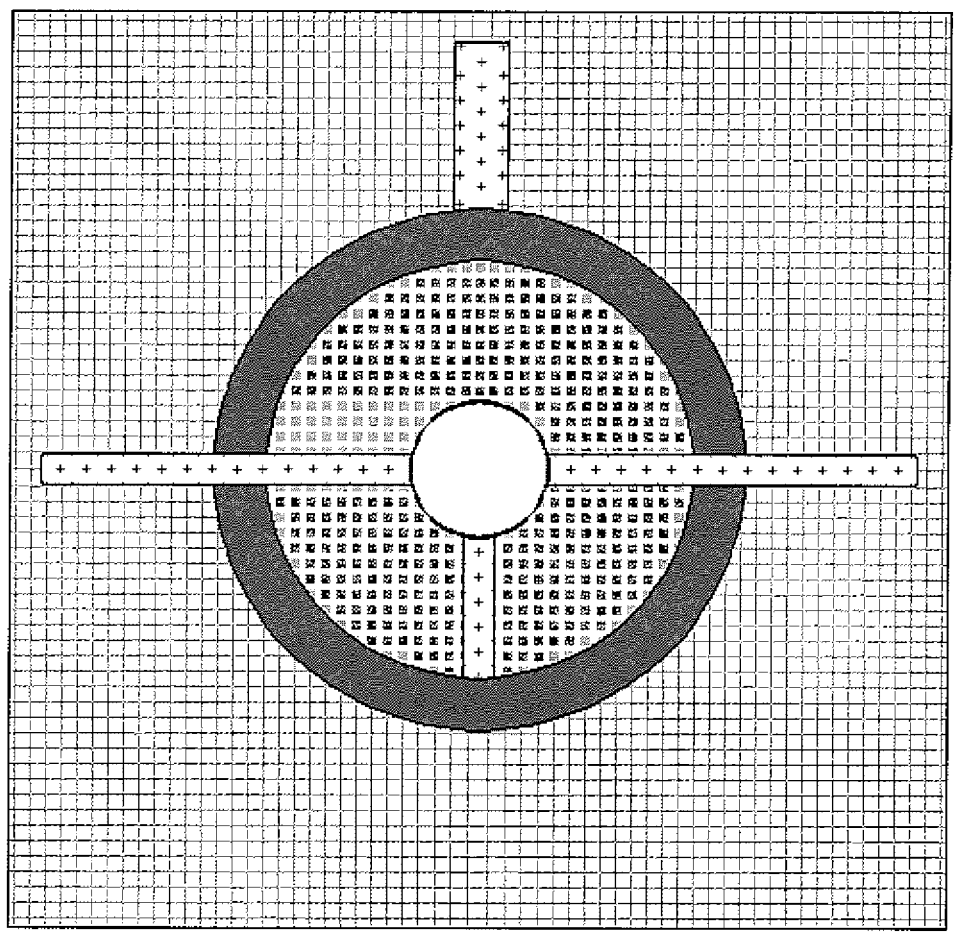

FIG. 17 shows a cubical device with four neutron guides in a slice through the middle. Additional guides project out of and into the page, making a total of six guides FIG. 18 shows a cubical device with a complex pattern of guides. These include guides that extend from the outside to the attenuating layer, from the middle of the device to the attenuating layer and guides that penetrate the attenuating layer.

EXAMPLE 1

Figure 1:
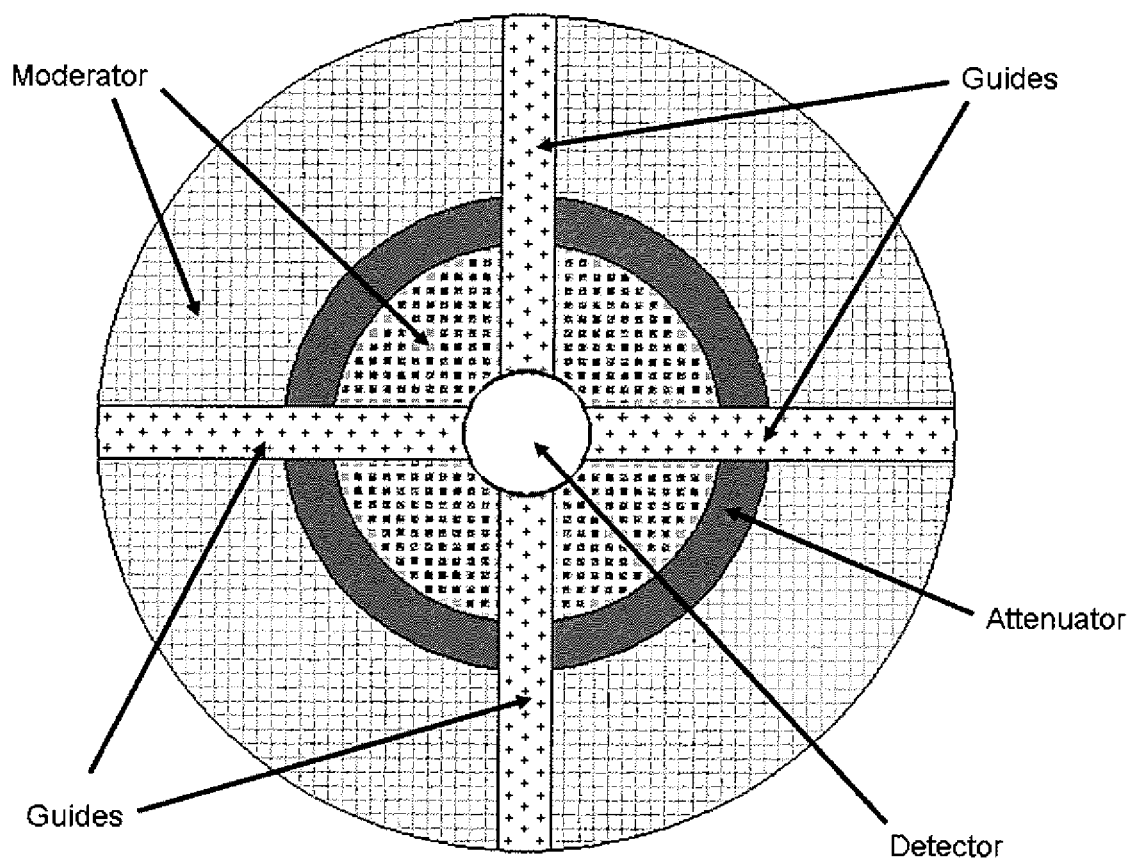

A device is provided with six thermal neutron guides spaced orthogonally around the inner core (four shown) (see FIG. 1). The neutron-moderating layers of the outer core comprise a $CH_2$ based polymeric material such as polyethylene. The neutron-attenuating layer of the outer core comprises a boron-containing material, such as boron-loaded polyethylene.

The inner core comprises a neutron proportional counter. Neutrons incident upon the counter may produce alpha particles via the $^{10}B(n, \alpha)$ reaction in $BF_3$, or protons and tritons via the $^3He(n, p)T$ reaction, which cause ionisation. Pulses are detected and give rise to a signal which passes from the detector to the electronics. The detector thus provides a signal indicative of the number of events in the detector. The signal from the detector may be monitored and recorded for a representative time period.

Test Parameters

Investigations were performed on the embodiment shown in FIG. 1, the device having the following characteristics:

TABLE 1

| Radii of shells. | | |
|---|---|---|
| Layer | Inner radius (cm) | Outer radius (cm) |
| Detector case | 1.60 | 1.65 |
| Inner $CH_2$ | 1.65 | 2.7 |
| Boron-loaded layer | 3.7 | 4.9 |
| Outer $CH_2$ | 3.9 | 10.48 |

The central detector used in the design retained the dimensions of the Centronic Limited SP9 spherical proportional counter, which uses $^3$He as the fill gas.

EXAMPLE 2

The device according to Example 1 was prepared with a range of different types of neutron guide. Once assembled, the guides have an approximate cross-sectional diameter of 1.5 cm, and extend to the external surface of the outer core. Three very distinct metals were selected for investigation, namely, copper, aluminium and lead. These metals were selected for the following reasons:

Copper: intermediate density, relatively high (n, 2n) cross-section (~0.6 b), which offers significant potential for increasing the response to high energy neutrons Aluminium: light, very transparent to thermal neutrons, and low (n, 2n) cross-section (~0.035 b)

Lead: very transparent to thermal neutrons, with a high (n, 2n) cross-section (~2 b)

Figure 2:
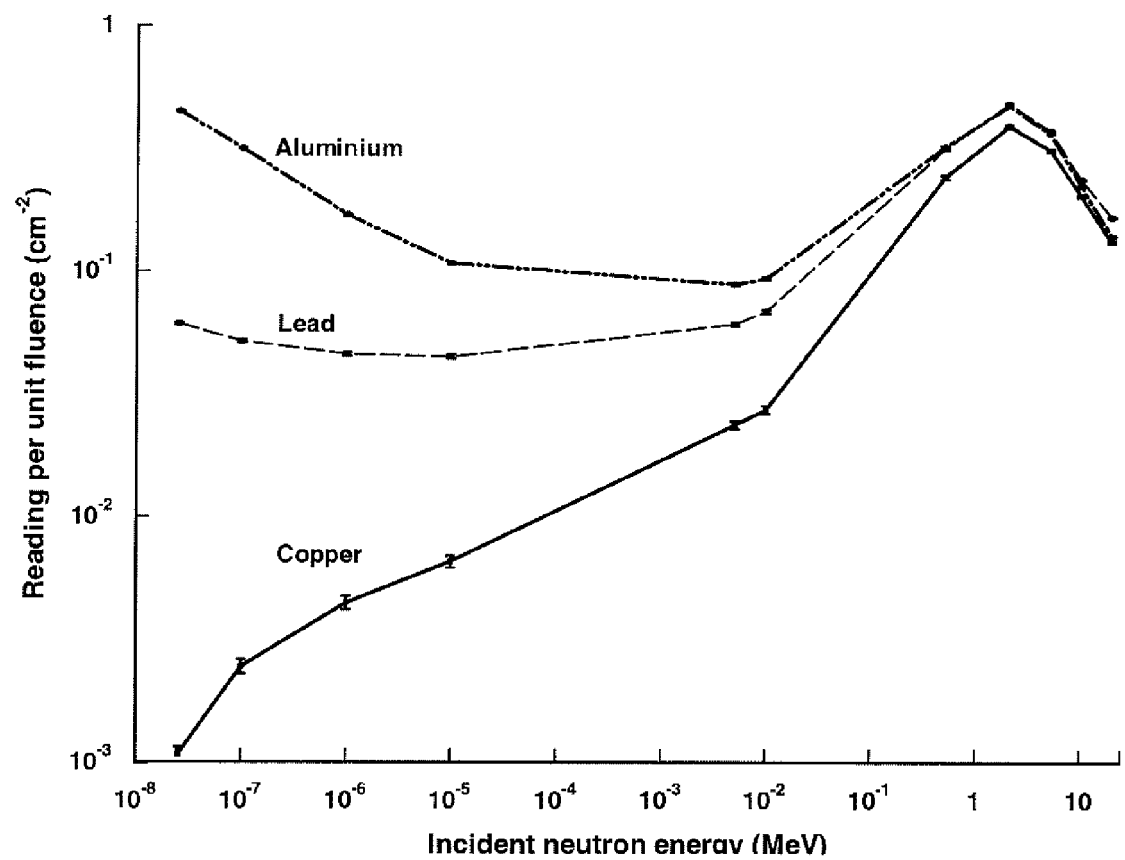
FIG. 2 shows the fluence response for 1.5 cm cross-sectional diameter aluminium, copper and lead rods extending from an inner detector to the outer surface of the device. The data are for a boron-loaded polyethylene attenuating layer with inner and outer radii of 3.7 and 4.9 cm.

For neutron energies of 1 MeV and above the choice of metal is not significant (FIGS. 2 and 3): the use of lead increases the response at 20 MeV over that for aluminium or copper, but only by about 20%. For lower energies (e.g. thermal neutrons), the response with the lead rods is 34 times higher than that for copper rods, whereas the response for aluminium rods is 250 times higher than that for copper rods. The main reason for this sensitivity is that the (n, γ) cross-sections vary significantly. When the density is taken into account, the capture cross-sections for lead and copper are four and 66 times that of aluminium respectively. Thus, whilst any one of these materials may be successfully employed as a neutron guide for the purpose of the present invention, the use of aluminium is preferred as it is highly transparent to thermal neutrons. Alternatively, other easily-machined metals may be used if they have a low atomic mass and no strong neutron capture reaction cross-sections.

Figure 3:
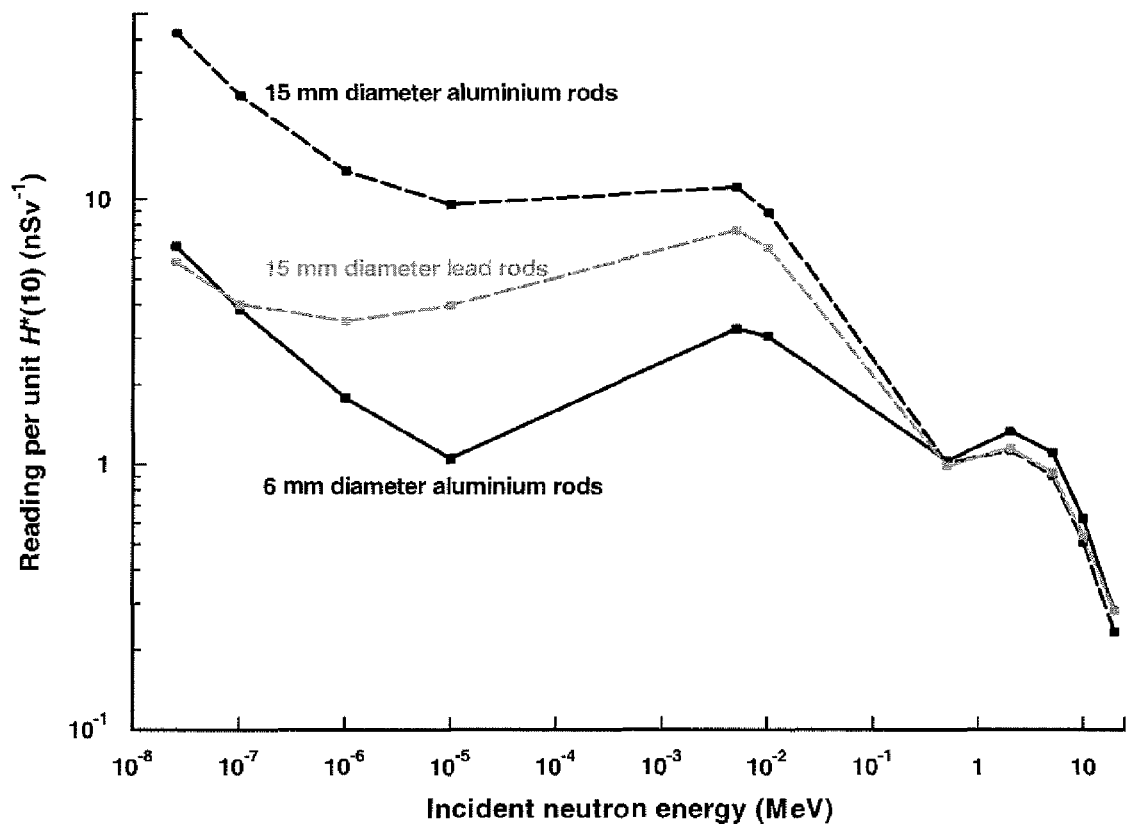
FIG. 3 shows the H*(10) response data for 15 mm and 6 mm cross-sectional diameter rods that extend to the outer surface of the moderator.

When either lead or aluminium is used in 1.5 cm diameter guides, the H*(10) response to thermal and intermediate energy neutrons is high (FIG. 3). The difference in the lead and aluminium data may be connected to the stronger elastic scattering in lead: more neutrons will be scattered out of the guide. It is not connected to the radiative capture cross-sections for thermal neutrons because those are 0.231 b for aluminium and 0.174 b for lead. For fast neutrons, the (n, γ) cross-section for lead is much higher than that for aluminium, with a lot of resonances, but for that energy range the response should be dominated by neutrons that are moderated in the $CH_2$ layer.

The response to thermal neutrons for aluminium and lead simply indicates that the rods are efficient at getting thermal and intermediate energy neutrons through the boron-loaded polyethylene. Aluminium also offers considerable mass savings because of its low density:

EXAMPLE 3

Figure 4:
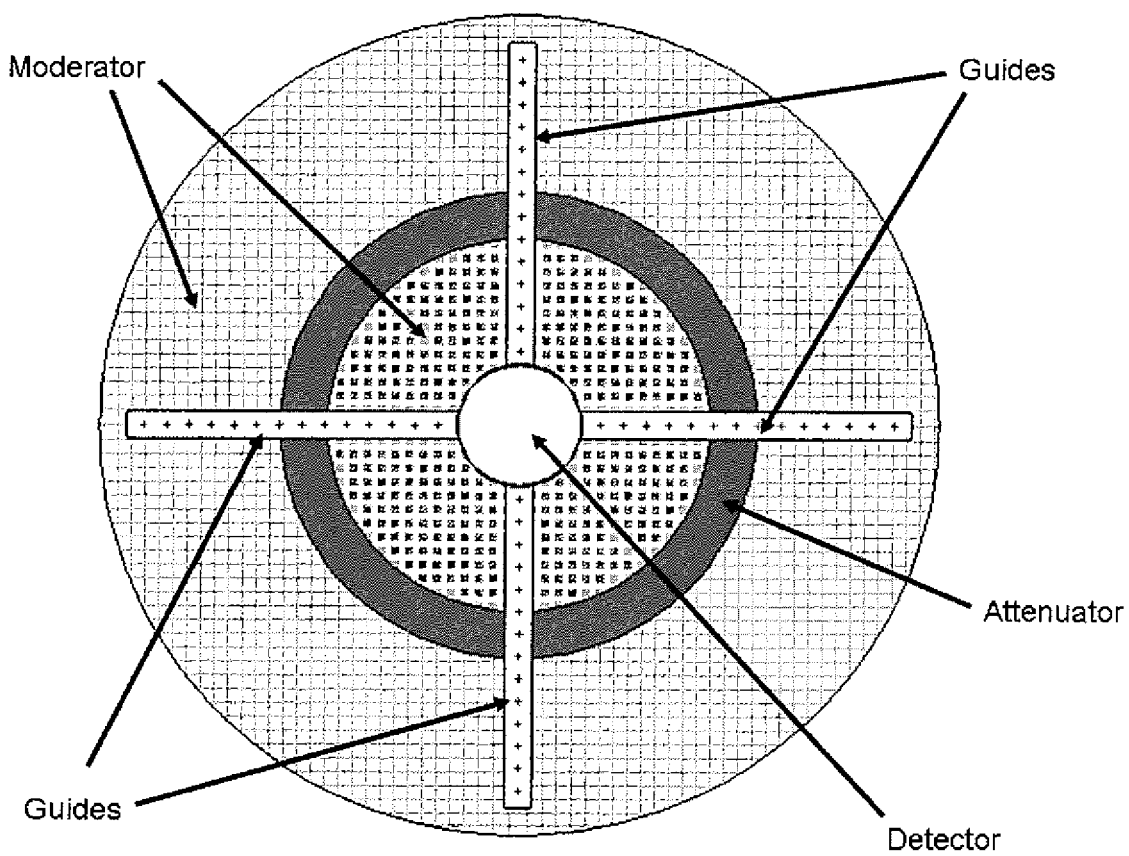
FIG. 4 shows a vertical cross-sectional representation of a device according to one embodiment of the present invention showing the neutron guide(s), inner core, and the polyethylene-moderating material and polyethene-attenuating material of the outer core.

The device described and employed in Example 2 includes neutron guides that extend to the external surface of the outer core of the device. The present Example describes and employs a device in which the thermal neutron guides do not reach the external surface of the outer core. In this Example, guides that have 5 mm of polyethylene between their end and the external surface of the outer core are employed (FIG. 4).

Figure 5:
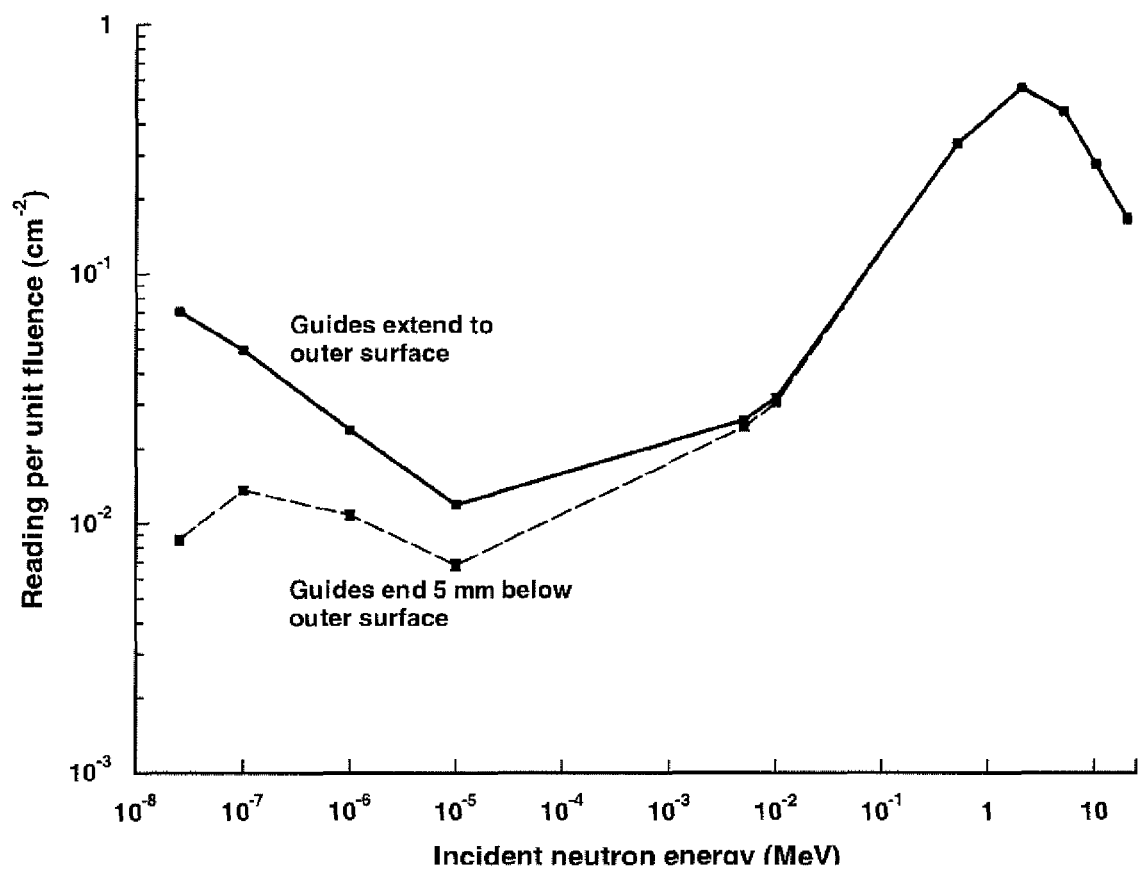
FIG. 5 shows the fluence response data for aluminium rods that reach the external surface of the outer core of the device or stop 5 mm beneath the external surface. The data are for aluminium rods with a diameter of 6 mm.
Figure 6:
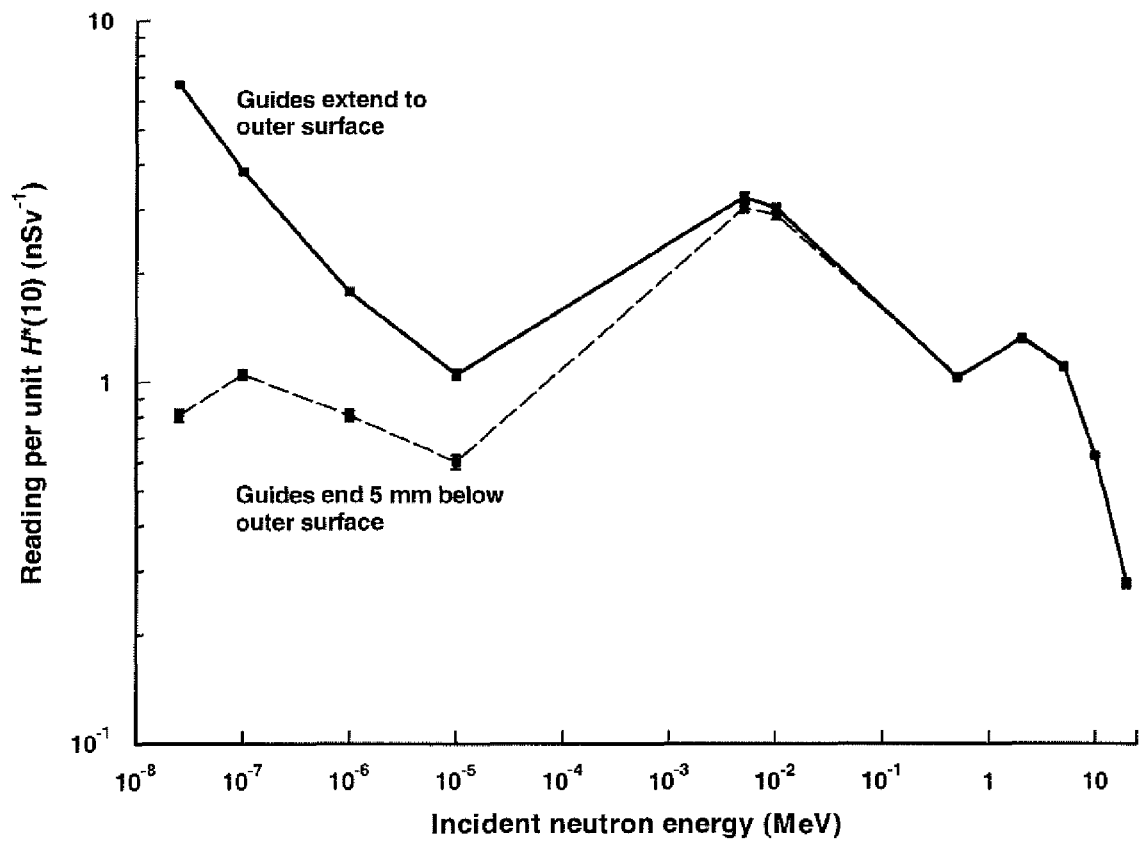
FIG. 6 shows the H*(10) response data for aluminium rods that reach the external surface of the outer core of the device or stop 5 mm beneath the external surface.

The results for this new arrangement are contrasted with those for guides that reach the surface of the device in FIGS. 5 and 6. These data show that for all energies of 10 keV and above, the difference in the response is not resolved by the calculations. This is because such energetic neutrons are not strongly moderated or attenuated in the above-described first 5 mm of the outer core.

The H*(10) response (FIG. 7) is seen to be markedly improved by this modification, with the thermal neutron response now being slightly lower than that for fast neutrons.

EXAMPLE 4

The present Example demonstrates how the fast neutron response of a device according to the present invention may be modified according to the location of the neutron-attenuating layer, in this case a boron-loaded polyethene layer.

Figure 7:
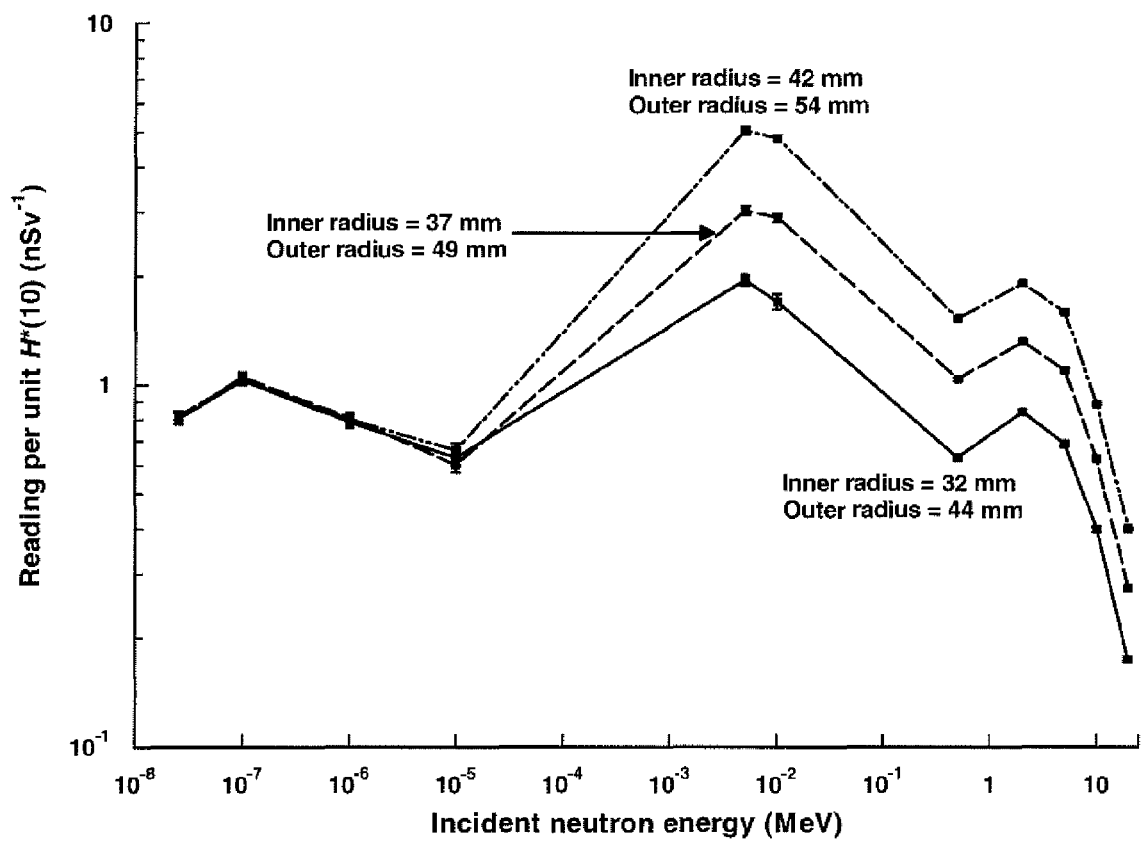
FIG. 7 shows the effect of varying the location of the neutron-attenuating boron-loaded layer for 6 mm cross-sectional diameter aluminium guide(s) that extend from the central detector to a depth of 5 mm from the external surface of the outer core of the device.

In each case, the thickness of the boron-loaded polyethylene layer was not varied: it remained 1.2 mm. Three different positions for the neutron-attenuating layer were investigated: inner and outer radii of 32 and 44 mm; 37 and 49 mm; 42 and 54 mm. These 5 mm increments do not produce a very significant effect on the response for energies of 10 eV and below, which is simply an indication that the response to neutrons with those energies is dominated by neutrons that travel along the guides (FIG. 7). For higher energies the response increases as the attenuating layer is moved further from the centre of the instrument because the attenuating layer becomes less effective and the moderation provided by the inner core becomes more effective.

EXAMPLE 5

Referring to the device(s) described in Example 3, two changes were made simultaneously to the device described in the present Example. First, the cross-sectional diameter of the guides was reduced to 5 mm from 6 mm. Secondly, the ends of the guides were extended by 1 mm, so that they terminated 4 mm as opposed to 5 mm from the external surface of the outer core of the device. The changes were made at the same time because they were intended to be complimentary: reducing the diameter of the guide will lower the thermal neutron response, but reducing the $CH_2$ covering the end of the guide should raise the thermal neutron response.

Figure 8:
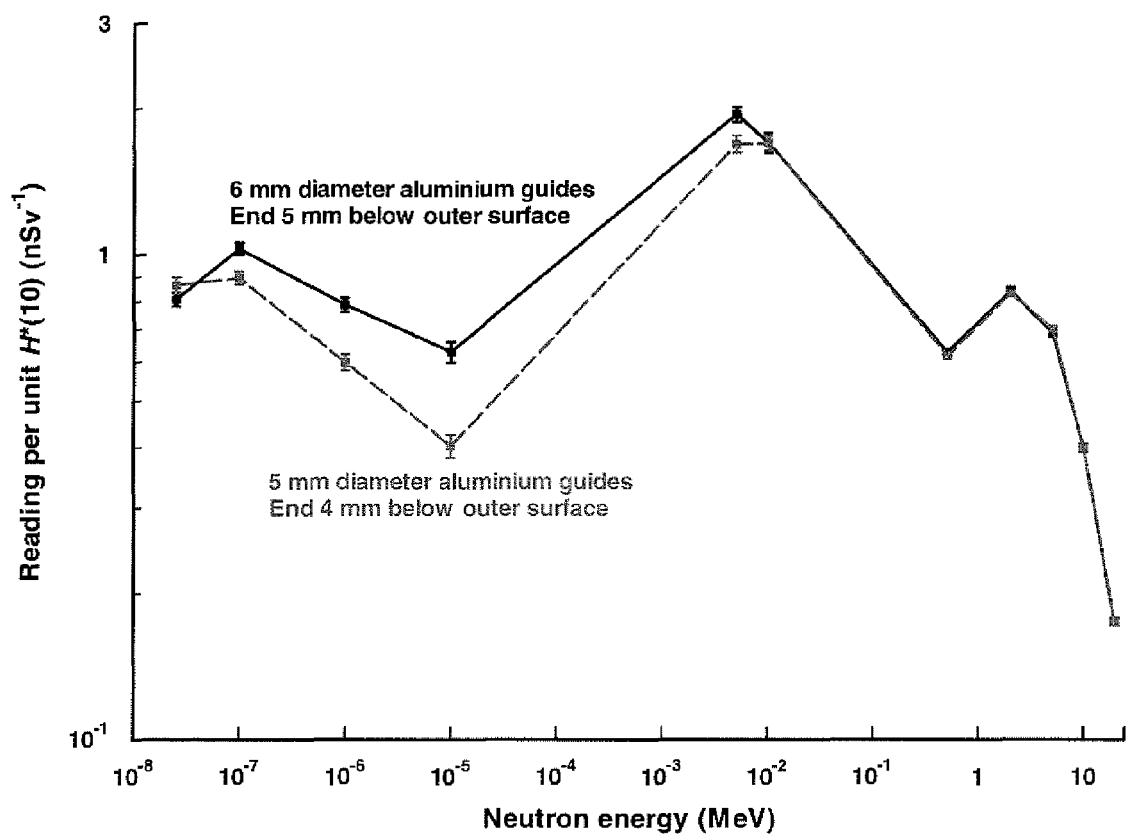
FIG. 8 shows the effect of changing both the guide cross-sectional diameter and the thickness of $CH_2$ covering the ends of the guide(s), i.e. between the ends of the guide(s) and the external surface of the outer core.

The effect of these changes is not dramatic. No change in the response for neutrons incident with energies of 10 keV or above is detected (FIG. 8), which is an indication that the response to those energies is not strongly dependent on the guides. There is also no significant difference for thermal neutrons, which probably shows that the narrowing of the guides offsets the reduction in polyethylene that must be traversed to reach the guides. These are the least penetrating neutrons, so they will enter the guide most strongly at the end.

For neutrons with energies from 0.1 eV to 5 keV, the two changes together cause a reduction in the response. Of the data calculated, the most significant difference is at 10 eV, for which the changes cause the response to fall by almost 40%. There is an improvement in the response at 5 keV, which reduces the magnitude of the potential overestimate at that energy.

When more source energies are used, the energy dependence of response is seen in more detail (FIG. 9). It is then seen that the minima of the H*(10) response are for energies around 20 eV and 200 keV and the maximum response is for 5 keV.

Three energy distributions were also used as sources: a 300 K Maxwell-Boltzmann distribution (thermal), and $^{252}$Cf and $^{241}$Am—Be radionuclide sources (ISO, 2001). The line does not connect these since it is simply intended to join up the monoenergetic response data. It is seen that the response to a thermal neutron energy distribution is higher than would be expected from the monoenergetic data. To calculate the thermal neutron ambient dose equivalent response, a value of 11.4 pSv $cm^2$ has been used for the fluence to dose equivalent conversion coefficient. This differs from the 25.3 meV value tabulated by ICRU and ICRP of 10.6 pSv $cm^2$ which is only applicable for a monoenergetic neutron field. The calculated response for the energy distribution is significantly higher than that for the monoenergetic field. The response to an isotropic source in MCNP is found to be the same as that for a unidirectional source for fast neutrons (FIG. 10).

EXAMPLE 6

A preferred embodiment of the current invention has the specifications shown in Table 2. This design would have a total moderator mass of 4.52 kg.

TABLE 2

Dimensional and material specifications of the design and total mass calculation for Example 6

| Material | Inner radius (cm) | Outer radius (cm) | Density (g $cm^{-3}$) | Mass (kg) |
|---|---|---|---|---|
| $^3$He | 0 | 1.6 | 2.4 $10^{-4}$ | 0.00 |
| Steel | 1.6 | 1.65 | 7.86 | 0.01 |
| Inner $CH_2$ | 1.65 | 3.2 | 0.93 | 0.11 |
| Boron-loaded $CH_2$ | 3.2 | 4.4 | 0.98 | 0.21 |
| Aluminium guides† | 1.65 | 10.0 | 2.7 | 0.04 |
| Outer CH2 | 4.4 | 10.48 | 0.93 | 4.15 |
| | | | Total | 4.52 |

†6 mm cross-sectional diameter

On the assumption that the addition of electronics and batteries would add no more than 1 kg to the total mass, the instrument would then be significantly lighter than the other commercially available designs: the NMS017 (Leake) has a mass of 6.2 kg; the SWENDI-II weighs 13.4 kg; the Wedholm Medical 2222D 10.5 kg; the Berthold LB6411 9.0 kg. This alone would be an attractive feature of the design, because a device that weighs less than 6 kg would be relatively easy to use in the workplace.

Users will not only be attracted solely by lightness of a survey instrument of the present invention, but will also be interested in its dosimetric performance: there are plenty of very light instruments available which do not have acceptable dose equivalent response characteristics. For example, the NMS017 has a total mass of only 2 kg, since it uses a 5" diameter moderating sphere (6.35 cm radius), but its H*(10) response to fast neutrons is more than two orders of magnitude lower than its response to thermal neutrons. Its H*(10) response to regions in the keV energy range is an order of magnitude higher than its response to thermal neutrons, so the response varies by more than a factor of 1000 in the energy range up to 20 MeV.

The most directly comparable of the widely used neutron survey instruments is the Leake design, since it is the lightest. It does not perform as well as some of the others dosimetrically, especially at higher energies, but it is the most widely used in the UK. When the comparison is made with a device of the present invention (FIG. 11) it is seen that the overestimate in the keV energy range is substantially reduced. The under-response to thermal neutrons is also eliminated, and the fast neutron response is slightly better. The energy dependence of response characteristics is clearly superior to those of the Leake.

Perhaps the best response characteristics of those previously published are those of the NRPB/BNFL design (Bartlett et al, 1997) with seven detectors, and a device mass of approximately 10 kg (FIG. 11). However, when compared to with a device of the present invention, the NRPB/BNFL device response characteristics are, on balance, poorer. In particular, the dip in the response at 100 keV and the peak at 5-10 MeV are reduced or removed by the use of guides in accordance with the present invention. These latter two features are highly significant in the workplace. The NRPB/BNFL device was also substantially heavier, which would cause significant operational disadvantages.

EXAMPLE 7

A preferred embodiment of the current invention has the specifications shown in Table 3. This design would have a total moderator mass of about 5 kg. This differs from Example 6 in that the guides are filled with air/vacuum instead of aluminium and they change radius at the attenuating layer: the guides are thinner through the inner moderating layer because their function is simply to channel thermalized neutrons, whereas in the outer moderating layer, their function is to channel and preferentially accept thermal neutrons. The boron-loaded attenuating layer in this example is located further from the detector, which aids the response to high-energy neutrons. The location of the boron-loaded attenuator in Example 6 would be preferred for fields which do not contain a significant component of fluence from high-energy neutrons.

TABLE 3

Dimensional and material specifications of the design and total mass calculation for Example 7

| Material | Inner radius (cm) | Outer radius (cm) | Density (g cm$^{-3}$) | Mass (kg) |
| --- | --- | --- | --- | --- |
| $^3$He | 0 | 1.6 | 2.4 10$^{-4}$ | 0.00 |
| Steel | 1.6 | 1.65 | 7.86 | 0.01 |
| Inner CH$_2$ | 1.65 | 5.0 | 0.92 | 0.40 |
| Air guide (inner)$^\dagger$ | 1.65 | 5.0 | 0.0012 | 0.00 |
| Boron-loaded CH$_2$ | 5.0 | 6.25 | 0.98 | 0.80 |
| Air guide (outer)$^\ddagger$ | 5.0 | 10.25 | 0.0012 | 0.00 |
| Outer CH2 | 6.25 | 11.00 | 0.92 | 3.74 |
|  |  |  | Total | 4.95 |

$^\dagger$7 mm cross-sectional diameter
$^\ddagger$1.4 mm cross-sectional diameter

EXAMPLE 8

The preferred embodiment of the device utilizes the parameters specified for Example 7 in Table 3, with the addition of hemispherical inserts to the end of each guide as shown in FIG. 13. The radius of the outer section of the neutron guide in each case is 0.7 cm and the radius of the sphere that forms the insert is 0.7 cm. The centre of the sphere is located 0.75 cm below the outer surface of the moderator.

In this embodiment the boron-loaded attenuating layer could be located as given for Examples 6 or 7 in Tables 2 or 3 respectively.

REFERENCES

Bartlett, D T, Tanner R J and Jones D G (1997). A new design of neutron dose equivalent survey instrument. Radiat Prot Dosim, 74 (4), 267-271.
Briesmeister J F (Ed) (2000). MCNP—a general Monte Carlo n-particle transport code, Version 4C. Report No. LA-13709-M. Los Alamos: LANL.
International Organization for Standardization (2001 a). Reference neutron radiations—Part 1: characteristics and methods of production. ISO 8529-1:2001 (E). Geneva: ISO.
Leake J W (1965). A spherical dose equivalent neutron detector. Nucl Instrum Meth, 45, 151-156.
Leake J W (1968). An improved spherical dose equivalent neutron detector. Nucl Instrum Meth, 63, 329-332.
Leake J W (1999). The effect of ICRP (74) on the response of neutron monitors. Nucl Instrum Meth, A421, 365-367.
Tanner, R J, Molinos, C, Roberts, N J, Bartlett, D T, Hager, L G, Jones, L N, Taylor, G C and Thomas, D J (2006). Practical implications of neutron survey instrument performance. HPA-RPD-016 (Chilton: HPA).

The invention claimed is:

1. An instrument for detecting radiation, the instrument comprising:
   i) an inner core comprising a neutron detector;
   ii) an outer core comprising a neutron-moderating material, said outer core having an external surface; and
   iii) a plurality of elongate thermal neutron guides having an inner end and an outer end, wherein said plurality of elongate thermal neutron guides are arranged in a substantially symmetrical pattern in the outer core, and wherein:
      (a) the plurality of elongate thermal neutron guides extend in a direction from the external surface of the outer core to the neutron detector and, in use, channel thermal neutrons towards the neutron detector,
      (b) the inner ends of the plurality of elongate thermal neutron guides are proximal to the neutron detector, and
      (c) the plurality of elongate thermal neutron guides are configured for channeling thermal neutrons from outside of the device to the neutron detector along the thermal neutron guides from the outer ends to the inner ends, and then to the neutron detector.

2. An instrument according to claim 1, wherein the neutron-moderating material comprises a hydrogen-containing material.

3. An instrument according to claim 1, wherein the inner ends of the plurality of elongate thermal neutron guides and the neutron detector are separated by a maximum distance of less than 20 mm or less than 15 mm.

4. An instrument according to claim 3, wherein the outer core further comprises one or more different material arranged as a layer within the outer core.

5. An instrument according to claim 4, wherein said one or more different material is a neutron-attenuating material.

6. An instrument according to claim 5, wherein:
(i) the neutron-attenuating material substantially surrounds the inner core, and/or
(ii) the plurality of elongate thermal neutron guides are substantially free of neutron-attenuating material, and/or
(iii) the inner core consists of a neutron detector.

7. An instrument according to claim 4, wherein said one or more different material is boron or a boron-containing material.

8. An instrument according to claim 4, wherein said one or more different material is sandwiched between first and second neutron-moderating material layers.

9. An instrument according to claim 4, wherein said one or more different material substantially surrounds the inner core.

10. An instrument according to claim 1, wherein the plurality of elongate thermal neutron guides extend to the external surface of the outer core.

11. An instrument according to claim 1, wherein the plurality of elongate thermal neutron guides extend to the inner core.

12. An instrument according to claim 1, wherein the plurality of elongate thermal neutron guides contact the neutron detector.

13. An instrument according to claim 1, wherein:
(i) the plurality of elongate thermal neutron guides are substantially free of the neutron-moderating material, and/or
(ii) the plurality of elongate thermal neutron guides are substantially free of hydrogen-containing solid material, and/or
(iii) the plurality of elongate thermal neutron guides are substantially free of boron-containing material, and/or
(iv) the plurality of elongate thermal neutron guides extend in a radial direction from the inner core towards the external surface of the outer core, and/or
(v) the plurality of elongate thermal neutron guides have a line-of-sight along their length.

14. An instrument according to claim 1, wherein the plurality of elongate thermal neutron guides comprise or consist of a solid.

15. An instrument according to claim 1, wherein the plurality of elongate thermal neutron guides comprise or consist of a metal.

16. An instrument according to claim 1, wherein the plurality of elongate thermal neutron guides comprise or consist of a metal selected from the group comprising aluminum, copper, and lead.

17. An instrument according to claim 1, wherein the plurality of elongate thermal neutron guides comprise a fluid.

18. An instrument according to claim 1, wherein the plurality of elongate thermal neutron guides comprise or consist of air, a vacuum, or a partial vacuum.

19. An instrument according to claim 1, wherein the traverse (radial) cross-sectional areas of the plurality of elongate thermal neutron guides are substantially the same along their length.

20. An instrument according to claim 1, wherein the traverse (radial) cross-sectional areas of the plurality of elongate thermal neutron guides are not the same along their length.

21. An instrument according to claim 1, wherein the traverse (radial) cross-sectional areas of the plurality of elongate thermal neutron guides are greater for a portion of the guides located towards the external surface of the outer core than for a portion of the guides located towards the inner core.

22. An instrument according to claim 1, wherein the plurality of elongate thermal neutron guides terminate in a concave end.

23. An instrument according to claim 1, wherein the plurality of elongate thermal neutron guides include a protective terminal end, which prevents debris from entering the guides.

24. An instrument according to claim 23, wherein the protective terminal end comprises a plug, or is a continuation of the wall(s) of the plurality of elongate thermal neutron guides, or is a continuation of the outer core.

25. An instrument according to claim 23, wherein the protective terminal end comprises a neutron-moderating material or a material transparent to thermal neutrons.

26. A method of detecting radiation using an instrument according to claim 1, wherein said method comprises contacting the instrument with neutrons, generating one or more signals following contact between the neutrons and neutron detector, and detecting said one or more signals.

27. A method according to claim 26, wherein said neutrons comprise thermal neutrons that are channeled towards the neutron detector by at least one elongate thermal neutron guide.

28. A method according to claim 26, wherein said neutrons comprise non-thermal neutrons.

29. A method according to claim 26, for enhancing the detection of thermal neutrons incident on an instrument that includes a neutron detector, said method comprising channeling thermal neutrons along at least one elongate thermal neutron guide, wherein the at least one elongate thermal neutron guide has an inner end positioned within 20 mm of the neutron detector, followed by detection thereof by the neutron detector.

30. A method according to claim 26, wherein the thermal neutrons have a mean energy of 25.3 meV at room temperature.

31. A method according to claim 26, wherein the instrument simultaneously detects high energy neutrons.

* * * * *